April 25, 1967  A. M. FEDER ETAL  3,316,551
METHOD OF GATHERING HYDROLOGIC AND HYDRANTIC DATA
BY THE USE OF ELECTROMAGNETIC RERADIATORS
Filed Jan. 14, 1965

David T. Barry
Allen M. Feder
INVENTORS

BY *John E. Vandigriff*

United States Patent Office 3,316,551
Patented Apr. 25, 1967

3,316,551
METHOD OF GATHERING HYDROLOGIC AND HYDRANTIC DATA BY THE USE OF ELECTROMAGNETIC RERADIATORS
Allen Martin Feder and David Thomas Barry, Dallas, Tex., assignors to Texas Instruments Incorporated, Dallas, Tex., a corporation of Delaware
Filed Jan. 14, 1965, Ser. No. 425,396
1 Claim. (Cl. 343—18)

This invention relates to radar surveillance techniques and more particularly to techniques of gathering oceanographic, navigation and other related data by the use of reradiators.

In the application of the principles of radar, a pulsed or continuous wave radio signal is transmitted by an antenna to observe an area adjacent to the transmitter. Objects in the area will reflect the signal back to a receiver in the vicinity of the transmitter to give an indication of the presence of the object. Where an indicator is used to record this presence, the reflected beam is directed to a cathode ray oscilloscope whose electron beam is constantly sweeping the scope in synchronism with the movement of the antenna. The intensity of the electron beam is influenced by the reflected radar wave so that, for example, the electron beam is fully or partially suppressed when no reflected energy is received, but obtains full intensity when the reflected energy is received. By timing the interval from transmission of a signal to its return the radar's circuitry permits the oscilloscope to indicate the position of the objects causing the reflection of the radar beam.

The angular position on the screen will be determined by the angular position of the transmitter antenna. The indication on the screen of the object's distance from the transmitter will be dependent upon the time required for the signal to be transmitted to the object, and then reflected back to the transmitter.

The radar principles outlined above have been utilized as navigational aids for airplanes, ships and the like. Radars have been used for mapping along with other devices such as camera and scanning infrared systems. Aerial photography and infrared search have only enhanced working conditions within those portions of electromagnetic spectrum having restricted utility. Specifically, no sensor operating in the infrared through ultraviolet spectrum portions is likely to record terrain information through heavy cloud cover. Similarly, aerial photography is useful only when there is clear visibility and when there are no obstructions between the camera and that which is to be photographed. Radar, however is not necessarily hampered by cloud cover or darkness as are the infrared sensor by the cloud cover and the camera by darkness. Radar does however have one outstanding requirement and that is that the target or object being sought must reflect the signal back to the transmitter. If the target is of absorbent material and absorbs the signal without reflecting it, then the target will not be detectable. However, in rare instances, a target may be detectable because it provides a considerably lower signal than its background. An object of the invention then is to provide a method by which data may be gathered by radar.

Another object of the invention is to provide a method of utilizing the capabilities of radar in conjunction with reflecting objects to recover navigational data.

Still another object is to provide a method for taking advantages of radar reflectivity of small objects to gather data.

Still another object is to utilize the capabilities of radar to gather data which are not available by aerial photography and infrared search methods.

Yet another object of the invention is to provide an improved method of gathering oceanographic and hydrographic data.

Other objects and features of the invention will become more readily understood from the following detailed description and appended claims when considered in conjunction with the accompanying drawings in which like reference numerals designate like parts throughout the figures thereof and in which:

Figure 1:
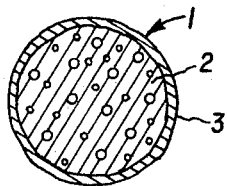
FIGURE 1 is a cross section of a metallic coated polystyrene bead which is used to produce radar display enhancement.

In making offshore studies, it has been found that surface waves, for example, by the assumption of various face angles, can return radar energy in a manner permitting interpretation of the wave's parameters. Other features however, such as long shore currents, may not necessarily generate surface patterns that are detectable to radar, or even to visual observation. Visual observation is made possible by dispersing various dye material into the water area of interest, but visual observation is not always possible. Radar observation may be made possible by the placement of quantities of small reradiators onto the water surface of interest.

Because of cost consideration involved in the manufacture and distribution of such reradiators over the water surface of interest, the reradiators must be available in large quantities at low cost. Polystyrene beads appear to embody many characteristics desirable for the purpose at hand and the beads are readily available.

Polystyrene beads are produced by many major chemical firms for example, Koppers Company Incorporated, which markets an expandable polystyrene under the trade name "Dylite" in the raw state. The polystyrene beads are approximately $\frac{1}{16}$ inch in diameter. These beads can be readily expanded by heating, e.g., in steam to various controllable diameters, with corresponding densities, up to approximately $\frac{3}{8}$ of an inch. If larger size reflectors are needed, they may be made by joining several of the small beads by gluing or by heat and pressure. The flexibility permitted in the expanding process allows the production of beads of any buoyancy capable of satisfying radar observation performance.

The pore spaces within expanded polystyrene beads have a very low order of interconnection. Consequently only a minute amount of water absorption will occur, and the beads will remain afloat at desired depths throughout extensive time periods.

The untreated expanded polystyrene beads form an excellent microwave absorbant and when dropped in an area which has high radar reflectivity would be detectable due to the absence of reflection, i.e., the absorption of the radar energy by the beads. When reflection enhancement is desired it is necessary to coat them with metallic reflecting materials. A suitable coating may be readily applied by well known vacuum metallizing techniques. Where the coating materials have to be resistant to attack by sea water, a coating such as nickel may be applied.

Vacuum metallized coatings, usually only a few microns in thickness, will not smooth the textural irregularities in the polystyrene bead surface as would electroplated coating. The vacuum metallized bead therefore will present a natural light diffusing surface that could have a dull appearing surface as does chalk or flat black paint. The coloring advantage which the vacuum metallizing process permits makes it possible that a bead strewn water surface can be prepared that is capable of highly enhancing radar observation while in the case of nickel or aluminum coatings remain camouflaged to many forms of detection. Conversely, coating materials such as copper could enhance visual detection where this is desired.

FIGURE 1 is a cross section of a metal coated polystyrene bead. The ball 1 has the bead body 2 of the expanded polystyrene and a metal coating 3 over the polystyrene. As indicated, the beads may be expanded anywhere from their initial size of 1/16 inch up to about 3/8 of an inch. To illustrate one feature of the beads, a cubic foot of the polystyrene beads which have been expanded to 1/4 to 3/8 inch in diameter weighs approximately 5 ounces.

The use of these metallized coated polystyrene beads finds at least one use in hydrography. In shallow water, the bottom topography has a definite effect on the surface and the mechanism of these effects are well known. Therefore it appears possible to interpret and display the existence of shoals and near surface obstructions and their probable extent by scattering an area of interest with the coated beads. The surface effects distribute the beads in various patterns and a radar search of the area after the beads have been dropped and distributed into patterns due to the surface effects can then be made. From this radar scan it is possible to interpret the existence of the shoals and near surface obstructions and their probable extent. Shore currents would cause a flow of the beads along with the currents thereby establishing a definite pattern which can be observed on a radar display making it possible to estimate the velocity, directions and widths of the long shore currents. A radar "moving target indicator" could be used for directly measuring the rate of travel of beads in a current or stream.

One application of the above principles to mine countermeasures would be possible since detecting surface effects caused by moored mines, nets and subsurface obstructions in channels is possible. Moored mines, particularly if used for anti-shipping and anti-submarine purposes, are normally placed in relatively shallow depths, that is, on the order of less than 50 feet. They might therefore be expected to present surface manifestations. These surface manifestations may be detected by the distribution of the metallic coated beads in the area and then surveyed and presented on the radar display.

Figure 3A:
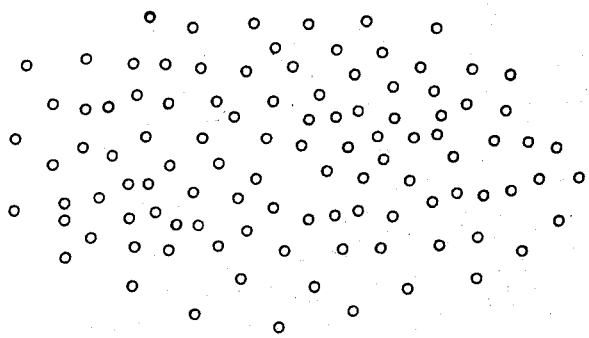
FIGURES 3a, 3b and 3c are pictorial sketches illustrating one use of the beads for navigational purposes.
Figure 3B:
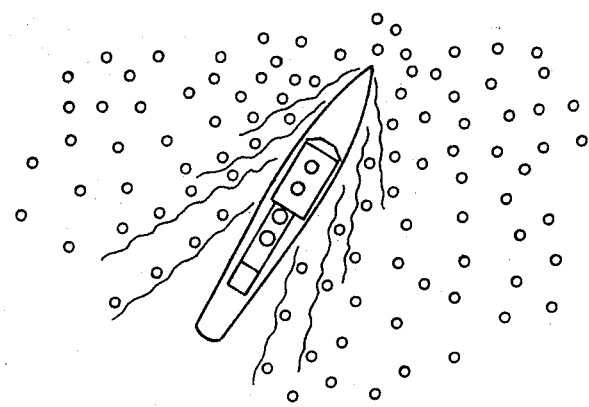
Figure 3C:
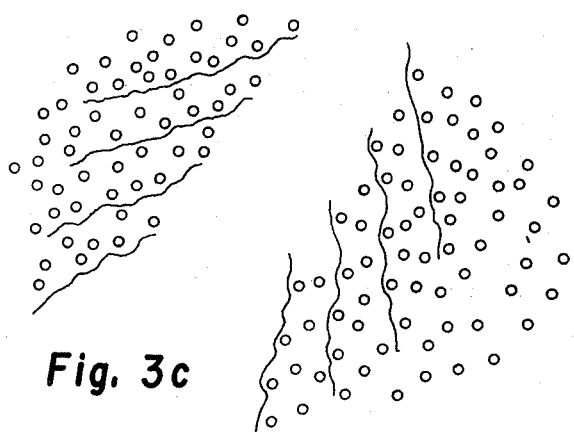

The use of the reradiating beads may be used also in the detecting of the entrances to a harbor through a mine field as shown in FIGURES 3a–3c. The beads 1 may be distributed over the harbor area 10 (FIGURE 3a) by air drop or from under the water by submarine prior to the entrance of a ship into the harbor. A ship 12 going through the mine field as shown in FIGURE 3b, would tend to cut a clear area 14 (FIGURE 3c) in the bead pattern since it creates a wake which sets up a countercurrent to the normal oceanograph current in the area. After allowing time for the dispersal of the beads in the area and traffic to go therethrough, subsequent reconnaissance permits the determination by radar the specific traffic routes through the mine field.

A second possible application for the radar intelligence technique involves the placing of beads along enemy shipping routes. Subsequent radar mapping of the disturbed bead patterns would then reveal the routes actually being used, and perhaps even a measure of the traffic volume.

The major advantage in the airborne radar approach to this type of problem is in the relatively low cost, the normal search radar apparatus is used only with the addition of the reradiating beads being distributed over the area. It is true that some of this information could be obtained through the use of photography, for example, but radar permits operation under weather and illumination conditions which preclude the use of photography and infrared equipment.

Applications of the beads are not limited to military purposes. The beads are readily applicable to other such studies as water pollution and sedimentation studies.

Figure 2:
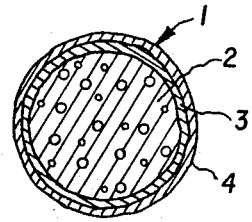
FIGURE 2 is a second embodiment of the bead used in information gathering techniques.

A second embodiment of the polystyrene bead is shown in FIGURE 2. The bead and metal coating is the same as that shown in FIGURE 1. The difference is the addition of another coating 4. Coating 4 is a water soluble material, for example polyvinyl alcohol or sugar, and may be used to vary the buoyancy of the bead. The coating may be applied to cause the bead to sink below the surface of the water to some specific level depending upon the density and weight of the bead resulting from the amount of expansion and thickness of the metallic and water soluble coatings. After a time, depending upon the thickness and solubility of the coating 4, the bead will rise to the surface when the coating has dissolved.

To illustrate, assume that a major stream empties into the seat and there is an interest in studying the subsurface current of the stream. A possible problem exists in tracing the course of the subsurface current, its area of influence and points where its density is neutralized so as to permit the dropping of a sediment load.

Beads are prepared having the additional coating as shown in FIGURE 2 to increase the density of the bead. This second coating is applied in such a manner or thickness to control the dissolving rate of the coating. After the coated beads are placed in the water, they sink through the upper water stratum to the stratum of interest, where they float at a natural buoyancy. The current velocity carries these beads along its course, the varying dissolving rates of the second coating creates decreases in bead density so the beads rise to the surface at varying points marking the course, speed and velocity of the stream. Those beads having the most resistant second coatings would tend to accumuate near the points where the current is neutralized or its heavier density is dissipated near the termination of the current. These bead accumulations can be expected to rise to the surface within a short time period, permitting their radar detection and mapping.

The above described method permits tracing of subcurrent streams, detecting their courses and velocity and directions of flow and permitting them to be mapped by radar. A similar technique would be used to dump a quantity of beads into streams to study pollution problems and similar problems.

In all cases, radar surveillance of the beads is not necessarily needed and visual techniques may be used, but when a wide area is to be covered, the large scanning areas of radar become very important.

Although the present invention has been shown and illustrated in terms of specific preferred embodiments or examples, it will become apparent that changes and modifications are possible without departing from the spirit and scope of the invention as defined by the appended claim.

What is claimed is:

A method of navigational mapping comprising the steps of depositing coated polystyrene beads onto the surface of a body of water, allowing said beads to become randomly dispersed over the surface of said body of water, radar scanning the body of water to detect the coated beads thereon, and radar scanning a second time after passage of a vessel through the area covered by said coated beads to detect the path of said vessel marked by the disrupted pattern of said coated beads.

References Cited by the Examiner

UNITED STATES PATENTS

| | | | |
|---|---|---|---|
| 2,519,825 | 8/1950 | De Ment. | |
| 2,896,204 | 7/1959 | Gille | 343—18 X |
| 2,932,741 | 4/1960 | McKay | 250—43.5 |
| 3,102,769 | 9/1963 | Hickey | 346—110 |
| 3,119,090 | 1/1964 | Springer | 73—170 |

FOREIGN PATENTS 119,730  7/1959  Russia

OTHER REFERENCES

Pochapsky, T. E.: Exploring Subsurface Waves with Neutrally Buoyant Floats, In I. S. A. Journal, October 1961, vol. 8, No. 10, pp. 34–37.

CHESTER L. JUSTUS, *Primary Examiner.*

G. M. FISHER, B. L. RIBANDO, *Assistant Examiners.*